L. FLEISCHMANN.
ROTARY CONVERTER.
APPLICATION FILED MAY 12, 1914.
1,224,729.
Patented May 1, 1917.
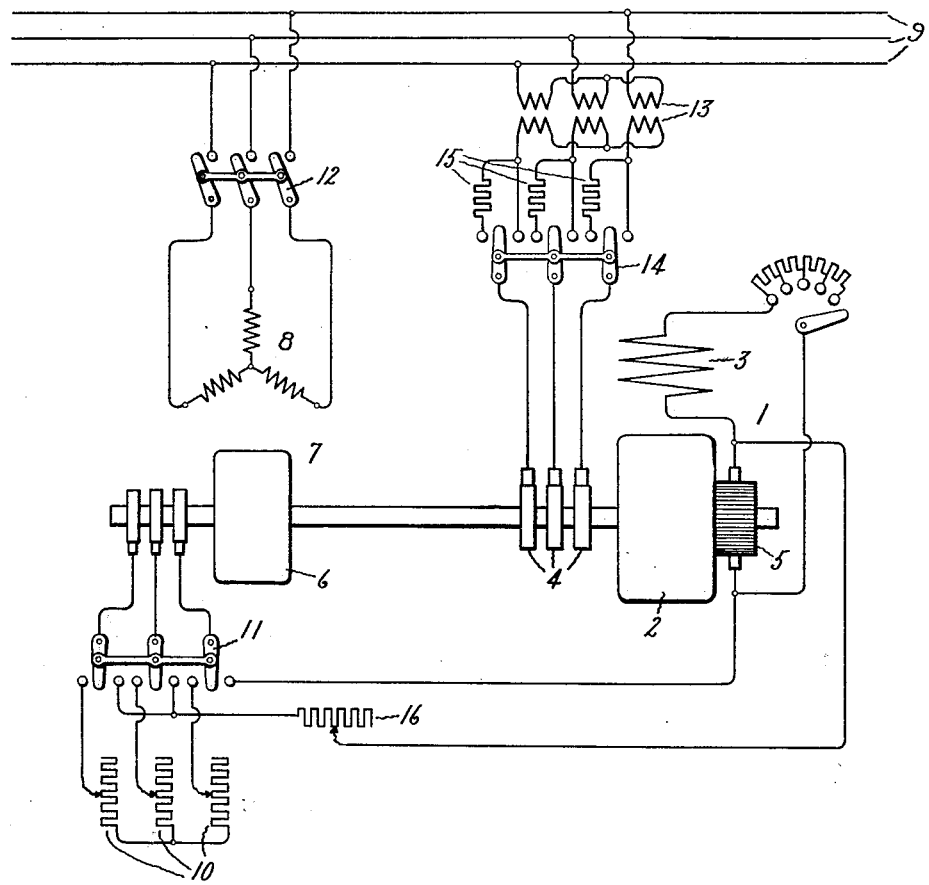
WITNESSES
INVENTOR
LIONEL FLEISCHMANN
BY
HIS ATTORNEY

UNITED STATES PATENT OFFICE.

LIONEL FLEISCHMANN, OF BERLIN, GERMANY, ASSIGNOR TO GENERAL ELECTRIC COMPANY, A CORPORATION OF NEW YORK.

ROTARY CONVERTER.

1,224,729.   Specification of Letters Patent.   Patented May 1, 1917.

Application filed May 12, 1914. Serial No. 838,161.

*To all whom it may concern:*

Be it known that I, LIONEL FLEISCHMANN, a citizen of the United States, residing at Berlin, Germany, have invented certain new and useful Improvements in Rotary Converters, of which the following is a specification.

My invention relates to rotary converters and has for its object a novel method of starting such machines whereby a rotary converter may be easily started and brought up to synchronism without causing any disturbance on the supply mains, and will always come up with the right polarity for connection to the direct current buses.

My method of starting a rotary converter, which has an induction motor with a phase wound secondary mechanically connected thereto, consists in connecting the motor to the alternating current mains as an induction motor and connecting the converter to the mains so as to apply only a portion of the normal voltage of the mains thereto, and then connecting the converter to the secondary of the induction motor to supply alternating current of slip frequency thereto. The converter may then be connected to the alternating current mains so as to apply full voltage thereto without causing any disturbance, as it will be in phase, and also to the direct current buses, as it will have the correct polarity.

For a better understanding of my invention reference may be had to the following description taken in connection with the accompanying drawing, in which the single figure is a diagram showing one embodiment of my invention.

In the drawing, 1 is a rotary converter having an armature 2 and a field winding 3. The armature of the rotary is provided with collector rings 4 and a commutator 5 and is mechanically connected to the phase wound secondary or rotatable member 6 of an alternating current motor 7. The motor 7 is shown as having a stationary member 8 which may be connected to alternating current mains 9, the rotatable member 6 being arranged to be short-circuited, as on resistances 10, to start the motor as an induction motor, and afterward to be connected to the commutator 5 of the rotary, to bring the motor and rotary up to synchronous speed. As is well known in the art, however, the rotatable and stationary members of the motor may be interchanged. Preferably, the rotary and motor are direct-connected as shown, in which case the number of poles of the motor and the rotary are the same. In the arrangement shown, a switch 11 connects the rotatable member 6 of the motor to either the resistances 10 or the commutator 5 of the rotary, a switch 12 connects the stationary member 8 of the motor to the alternating current mains 9, and a switch 14 connects the collector rings 4 of the rotary to the alternating current mains so that only a portion of the normal voltage is applied to the rings, as by means of resistances 15 connected in this circuit, or the normal voltage is applied to the rings by connecting the rings 4 directly to the transformers 13.

In starting up the rotary, the collector rings 4 are connected up to the mains 9 so as to have applied thereto only a portion of the normal voltage as explained above, and the stationary member 8 of the motor is connected to the mains, the switch 11 being in the position in which the rotatable member 6 of the motor is short-circuited on the resistances 10, in order to start the motor as an induction motor. These resistances may be gradually cut out so as to finally short-circuit the windings of the rotatable member 6 on themselves, thereby speeding the motor up close to synchronism. The switch 11 is then shifted so as to connect the rotatable member 6 of the motor to the commutator 5 of the rotary. Alternating current of the slip frequency is thus supplied from the rotary to the rotatable member of the motor. This current produces a large torque in the motor which pulls it and the rotary into synchronism. As shown, a resistance 16 may be connected in the circuit of the commutator and the rotatable member 6 so as to limit the current therein. Two of the phases of the rotatable member may be connected together and in series with the third phase across the commutator 5. When synchronism is reached, the collector rings 4 of the rotary may be connected to the mains so as to apply full voltage thereto, without causing any disturbance whatsoever, and then the connections of the members of the motor to the commutator and to the mains may be opened.

Transformers may or may not be introduced between the mains and the motor or rotary as is usual in such systems. Also, in case the motor and rotary are mechanically connected so as to run at different angular speeds, the number of poles of the motor will be equal to the number of poles of the rotary converter divided by the ratio of the angular speeds, and I desire it to be understood that I aim in the appended claims to cover all such modifications as well as any others which do not depart from the spirit and scope of my invention.

What I claim as new and desire to secure by Letters Patent of the United States, is:—

1. The method of starting a rotary converter having an induction motor with a phase wound secondary mechanically connected thereto, which consists in connecting said motor to the alternating current mains as an induction motor and connecting said converter to the mains so as to apply only a portion of the normal voltage of the mains thereto, and then connecting the converter to the secondary of the induction motor to supply alternating current of slip frequency thereto.

2. The method of starting a rotary converter having an induction motor with a phase wound secondary mechanically connected thereto, which consists in connecting said motor to the alternating current mains as an induction motor and connecting said converter to the mains so as to apply only a portion of the normal voltage of the mains thereto, then connecting the converter to the secondary of the induction motor to supply alternating current of slip frequency thereto, and then connecting said converter to said mains so as to supply the full voltage of the mains thereto.

3. The method of starting a rotary converter having an induction motor with a phase wound secondary mechanically connected thereto, which consists in connecting said motor to the alternating current mains as an induction motor and connecting said converter to the mains so as to apply only a portion of the normal voltage of the mains thereto, then connecting the converter to the secondary of the induction motor to supply alternating current of slip frequency thereto, and then connecting said converter to said mains so as to supply the full voltage of the mains thereto and disconnecting said motor from the mains and from the converter.

In witness whereof, I have hereunto set my hand this 24th day of April 1914.

LIONEL FLEISCHMANN.

Witnesses:
RICHARD NEUMANN,
WALTHER REINHARDT.

Copies of this patent may be obtained for five cents each, by addressing the "Commissioner of Patents, Washington, D. C."